United States Patent
Lu

(10) Patent No.: US 10,855,171 B2
(45) Date of Patent: Dec. 1, 2020

(54) MIX-MODE PFC CIRCUIT AND A METHOD THEREOF

(71) Applicant: Chengdu Monolithic Power Systems Co., Ltd., Chengdu (CN)

(72) Inventor: Wenbin Lu, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/697,095

(22) Filed: Nov. 26, 2019

(65) Prior Publication Data

US 2020/0244159 A1 Jul. 30, 2020

(30) Foreign Application Priority Data

Jan. 30, 2019 (CN) .......................... 2019 1 0092689

(51) Int. Cl.
*H02M 1/42* (2007.01)
*H02M 1/00* (2006.01)

(52) U.S. Cl.
CPC ....... *H02M 1/4225* (2013.01); *H02M 1/4266* (2013.01); *H02M 2001/0012* (2013.01)

(58) Field of Classification Search
CPC .... H02M 1/4225; H02M 1/42; H02M 1/4208; H02M 1/4266; H02M 2001/0012; H02M 2001/003

See application file for complete search history.

(56) References Cited

U.S. PATENT DOCUMENTS

| | | | |
|---|---|---|---|
| 9,241,381 B2 | 1/2016 | Feng et al. | |
| 9,479,046 B2 | 10/2016 | Lin et al. | |
| 9,621,028 B2 | 4/2017 | Lin et al. | |
| 9,812,950 B2 | 11/2017 | Lu et al. | |
| 2008/0310201 A1* | 12/2008 | Maksimovic | H03K 7/08 363/85 |
| 2014/0285163 A1* | 9/2014 | Lin | H02M 1/42 323/205 |
| 2015/0303790 A1* | 10/2015 | Lin | H02M 1/4225 363/89 |
| 2016/0276924 A1* | 9/2016 | Castelli | H02M 3/33515 |
| 2018/0041119 A1* | 2/2018 | Zhang | H02M 1/4225 |
| 2020/0141993 A1* | 5/2020 | Nikic | G03G 13/025 |

* cited by examiner

*Primary Examiner* — Adolf D Berhane
(74) *Attorney, Agent, or Firm* — Perkins Coie LLP

(57) ABSTRACT

A control method of a PFC (Power Factor Correction) circuit having at least one power switch, the control method having: producing an effective value of an input voltage; generating a compensation signal based on an output voltage and an output voltage reference signal; generating an on time signal based on the compensation signal, the effective value of the input voltage, a first on time period value and a second on time period value; generating an on time delay signal based on the input voltage, the output voltage, the first on time period value, the effective value of the input voltage and the compensation signal; and generating a current valley signal based on the input voltage, the effective value of the input voltage, the compensation signal, the second on time period value, and an inductance value of the inductor adopted by the PFC circuit.

18 Claims, 8 Drawing Sheets

MIX-MODE PFC CIRCUIT AND A METHOD THEREOF

CROSS-REFERENCE TO RELATED APPLICATIONS

This application claims priority to and the benefit of Chinese Patent Application No. 201910092689.8, filed on Jan. 30, 2019, which is incorporated herein by reference in its entirety.

FIELD

The present invention relates generally to electronic circuits, and more particularly but not exclusively to digital PFC circuit and the method thereof.

BACKGROUND

PFC (Power Factor Correction) circuits are widely adopted by power converter systems, for regulating a phase of an input current to improve a power factor of the system, so as to reduce power dissipation.

Commonly, a mains supply voltage with a sine wave is rectified by a rectifier to get an input voltage Vin provided to a PFC circuit. To realize PFC control, the waveform and the phase of the input current Iin should follow the waveform and the phase of the input voltage Vin. FIG. 1 shows an average input current Iin_avg controlled to be in a rectified sine wave to follow the waveform of the input voltage Vin.

In prior art, a control signal of a power switch of the PFC circuit is generated based on a peak current Ipk flowing through an inductance of the PFC circuit. However, the prior art method has two defects. Firstly, a detecting circuit of the peak current Ipk is very complicated. Secondly, the wave of the average input current Iavg obtained in this way is not a perfect rectified sine wave, thus the efficiency of the PFC circuit is affected, especially when the PFC circuit works in DCM (Discontinuous Current Mode).

SUMMARY

It is an object of the present invention to realize PFC control based on an output power of the PFC circuit. The PFC circuit in the present invention has simple structure, high power factor and high efficiency.

In accomplishing the above and other objects, there has been provided, in accordance with an embodiment of the present invention, a control method of a PFC (Power Factor Correction) circuit, wherein the PFC circuit comprises a power circuit having at least one power switch, the control method comprising: producing an effective value of an input voltage of the PFC circuit; generating a compensation signal based on an output voltage of the PFC circuit and an output voltage reference signal; generating an on time signal based on the compensation signal, the effective value of the input voltage, a first on time period value and a second on time period value; generating an on time delay signal based on the input voltage, the output voltage, the first on time period value, the effective value of the input voltage and the compensation signal; and generating a current valley signal based on the input voltage, the effective value of the input voltage, the compensation signal, the second on time period value, and an inductance value of the inductor adopted by the PFC circuit; wherein the first on time period value is a value of the on time signal when the PFC circuit works at a transition time from critical current mode (CRM) to discontinuous current mode (DCM), and the second on time period value is a value of the on time signal when the PFC circuit works at a transition time from critical current mode (CRM) to continuous current mode (CCM).

In accomplishing the above and other objects, there has been provided, in accordance with an embodiment of the present invention, a control method of a PFC (Power Factor Correction) circuit, wherein the PFC circuit comprises a power circuit having at least one power switch, the control method comprising: producing an effective value of an input voltage of the PFC circuit; generating a compensation signal based on an output voltage of the PFC circuit and an output voltage reference signal; generating an on time signal based on the compensation signal, the effective value of the input voltage, a lower limit and an upper limit of the compensation signal; generating an on time delay signal based on the input voltage, the output voltage, the lower limit of the compensation signal, the effective value of the input voltage and the compensation signal; generating a current valley signal based on the input voltage, the effective value of the input voltage, the compensation signal, the upper limit of the compensation signal, and an inductance value of the inductor adopted by the PFC circuit; wherein the lower limit of the compensation signal represents a value of the compensation signal when the PFC circuit works at a transition time from critical current mode (CRM) to discontinuous current mode (DCM), and the upper limit of the compensation signal represents a value of the compensation signal when the PFC circuit works at a transition time from critical current mode (CRM) to continuous current mode (CCM).

In accomplishing the above and other objects, there has been provided, in accordance with an embodiment of the present invention, a PFC circuit having at least a power switch, comprising: an analog-to-digital converting circuit, configured to receive an input voltage and an output voltage of the PFC circuit, and to provide a digitalized input voltage and a digitalized output voltage; a calculating circuit, configured to receive the digitalized input voltage and the digitalized output voltage, and to provide an on time signal, an on time delay signal and a valley current signal; a comparing circuit, configured to provide a comparing signal based on the valley current signal and an inductance current signal indicating a current flowing through an inductor of the PFC circuit; and a pulse circuit, configured to control on operation of the power switch based on the comparing signal and the on time delay signal, and to control off operation of the power switch based on the on time signal; wherein a minimum value of the on time signal is fixed to a first on time period value, and a maximum value of the on time signal is fixed to a second on time period value.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
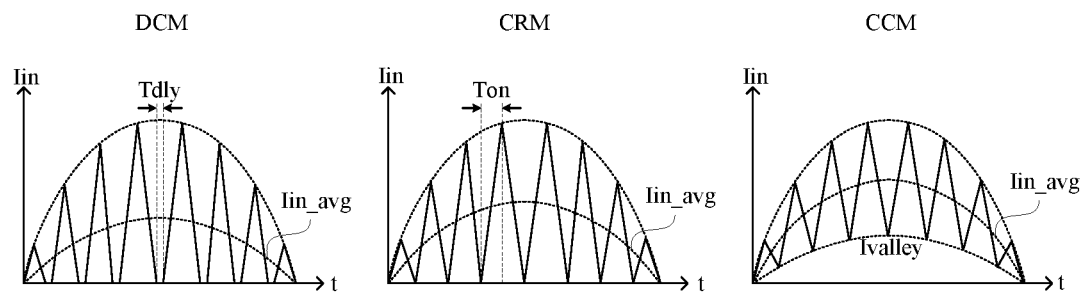
FIG. 1 schematically shows prior art waveforms of the input current Iin of a PFC circuit when working in different work modes.

FIG. 1 schematically shows prior art waveforms of the input current Iin of a PFC circuit when working in different work modes (DCM, CRM, CCM), wherein DCM is discontinuous current mode, CRM is critical current mode and CCM is continuous current mode. As shown in FIG. 1, the input current Iin of the PFC circuit is determined by an on time delay signal Tdly, an on time signal Ton and a valley current signal Ivalley. The on time delay signal Tdly represents a time period from a moment that a current flowing through the inductance decreases to zero after the main switch is turned off, to a moment that the main switch is turned on again, during when the PFC circuit works in DCM. The on time signal Ton represents a time period during when the main switch of the PFC circuit is on in a single switching period. The valley current signal Ivalley represents a minimum value of the input current of the PFC circuit in every switching period. As can be seen from FIG. 1: when the PFC circuit works in DCM, the waveform of the input current is determined as long as the on time delay signal Tdly and the on time signal Ton are set; when the PFC circuit works in CRM (CRitical current Mode), the waveform of the input current Iin is determined as long as the on time signal Ton is set; when the PFC circuit works in CCM (Continuous Current Mode), the waveform of the input current Iin is determined as long as the on time signal Ton and the valley current signal Ivalley are set.

Figure 2:
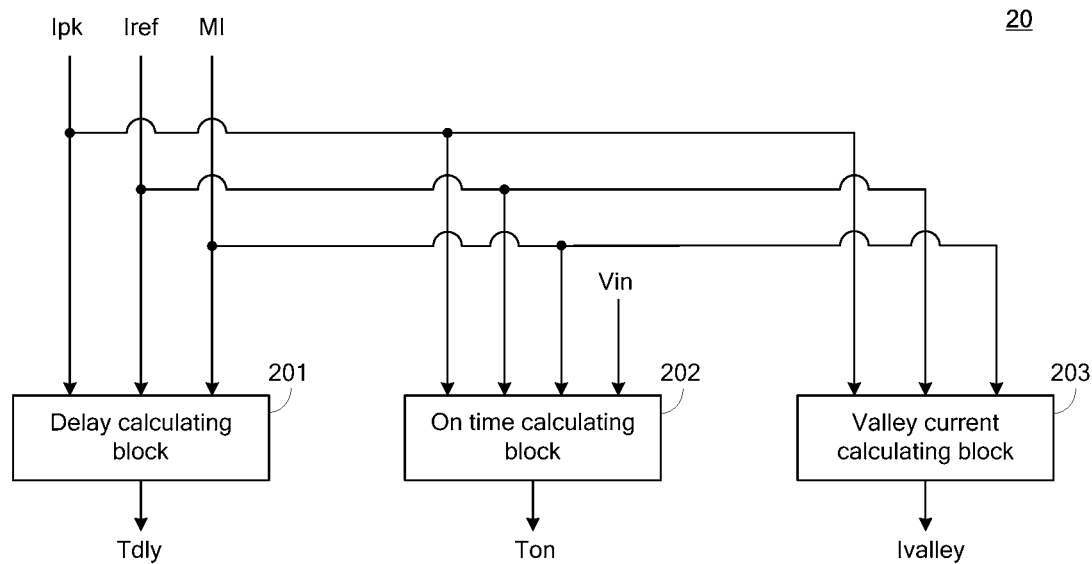
FIG. 2 schematically shows a block diagram of a prior art PFC control circuit 20.

FIG. 2 schematically shows a block diagram of a prior art PFC control circuit 20. As shown in FIG. 2, the PFC control circuit 20 comprises: a delay calculating block 201, an on time calculating block 202 and a valley current calculating block 203. The delay calculating block 201 provides the on time delay signal Tdly based on an inductance peak current Ipk, a current reference signal Iref and a mode indicating signal MI. The on time calculating block 202 provides the on time signal Ton based on the inductance peak current Ipk, the current reference signal Iref, the mode indicating signal MI and the input voltage Vin. The valley current calculating block 203 provides the valley current signal Ivalley based on the inductance peak current Ipk, the current reference signal Iref and the mode indicating signal MI. The current reference signal Iref is a reference of the average input current Iin_avg shown in FIG. 1. The PFC control circuit 20 may be adopted by a switching converter having a boost topology, which has the input current equals to the inductance current.

As known to persons of ordinary skill in the art, the detecting circuit of the inductance peak current Ipk is very complicated. Moreover, the waveform of the average input current Iin_avg controlled based on the inductance peak current Ipk does not perfectly match the rectified sine wave, especially when the PFC circuit works in DCM.

Figure 3:
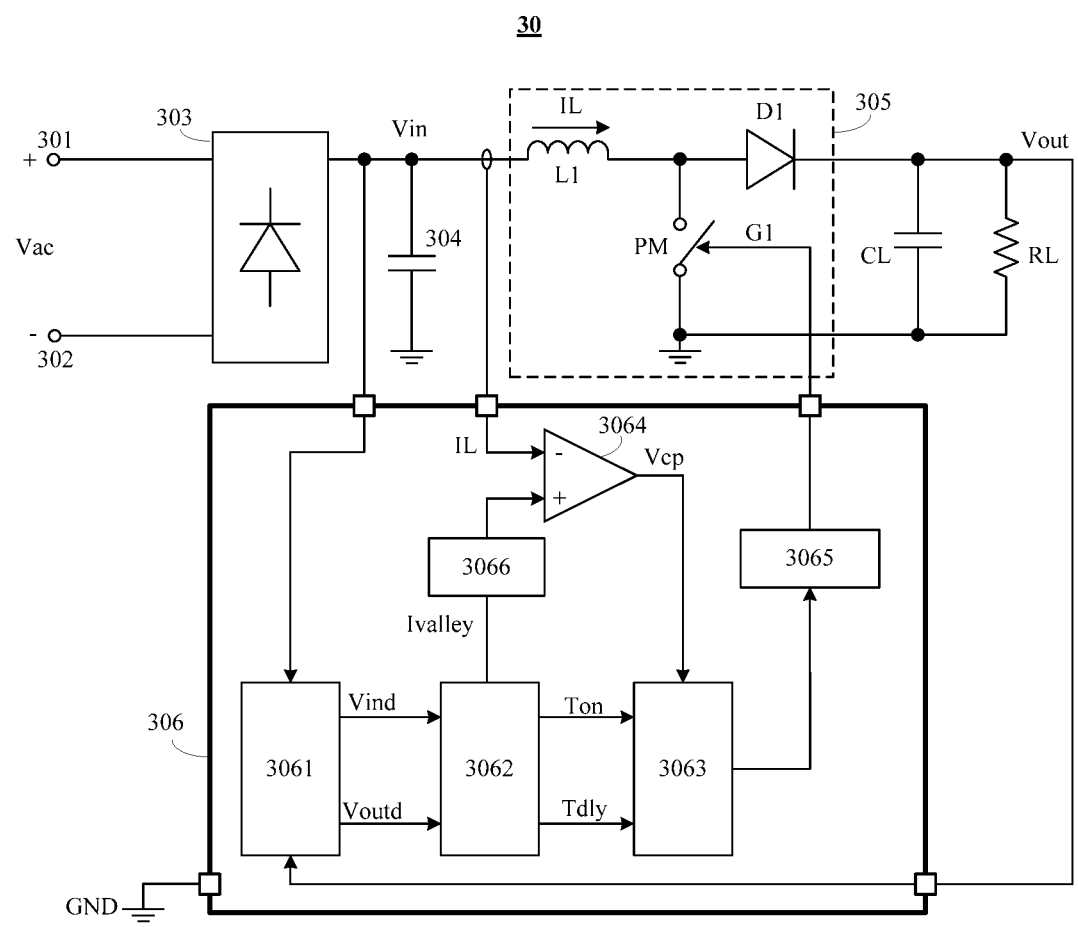
FIG. 3 schematically shows a PFC circuit 30 in accordance with an embodiment of the present invention.

FIG. 3 schematically shows a PFC circuit 30 in accordance with an embodiment of the present invention. As show in FIG. 3, the PFC circuit 30 comprises: a first input terminal 301 and a second input terminal 302 configured to receive an input AC voltage Vac with a sine wave; a rectifying circuit 303, coupled to the first input terminal 301 and the second input terminal 302 to receive the input AC voltage Vac, wherein the rectifying circuit 303 converts the input AC voltage Vac to an input voltage Vin with a rectified sine wave; an input capacitor 304, coupled between the rectifying circuit 303 and a ground reference GND; a power circuit 305, having at least one power switch PM, wherein the power circuit 305 is coupled to the rectifying circuit 303 to receive the input voltage Vin, and to convert the input voltage Vin to an output voltage Vout with desired voltage level to supply to a load or a post stage circuit represented by a resistor RL in FIG. 3; an output capacitor CL, coupled between an output voltage and the ground reference GND; a PFC control circuit 306, configured to receive the input voltage Vin, the output voltage Vout and an inductor current signal IL, and to provide a power switch control signal G1 to a control terminal of the power switch PM, so that to control a power conversion of the power circuit 305.

In FIG. 3, the power circuit 305 comprises a boost converter, having an inductor L1, the power switch PM and a diode D1. The power switch PM is controlled by the power switch control signal G1 provided by the PFC control circuit 306, and is turned on and off alternately with the diode D1, to control the inductor current signal IL and the output voltage Vout. In other embodiments, the diode D1 is replaced by a controllable power switch. In some embodiment, the power circuit 305 has other topologies, e.g., buck-boost converter.

In the example of FIG. 3, the PFC control circuit 306 comprises: an analog-to-digital converting circuit 3061, configured to receive the input voltage Vin and the output voltage Vout, and to provide a digitalized input voltage Vind and a digitalized output voltage Voutd; a calculating circuit 3062, configured to receive the digitalized input voltage Vind and the digitalized output voltage Voutd, and to provide the on time signal Ton, the on time delay signal Tdly and the valley current signal Ivalley; a comparing circuit 3064, configured to provide a comparing signal Vcp based on the valley current signal Ivalley and the inductance current signal IL; and a pulse circuit 3063, configured to control the on operation of the power switch PM based on the comparing signal Vcp and the on time delay signal Tdly, and to control the off operation of the power switch PM based on the on time signal Ton; wherein, a minimum value of the on time signal Ton is fixed to a first constant time Ton(P0), and a maximum value of the on time signal Ton is fixed to a second constant time Ton(P1). The first constant time Ton (P0) is a value of the on time signal Ton when a value of an output power Pout of the PFC circuit is P0, and the second constant time Ton(P1) is a value of the on time signal Ton when the value of the output power Pout is P1.

P0 is the value of the output power Pout when the PFC circuit works at a transition time from CRM to DCM, and P1 is the value of the output power Pout when the PFC circuit works at a transition time from CRM to CCM. Correspondingly, Ton(P0) is the value of the on time signal Ton when the PFC circuit works at the transition time from CRM to DCM, and Ton(P1) is the value of the on time signal Ton when the PFC circuit works at the transition time from CRM to CCM.

It should be understood that the input voltage Vin and the output voltage Vout may be partially provided to the PFC control circuit 306 to fit an input range of the PFC control circuit 306.

The analog-to-digital converting circuit 3061 receives the input voltage Vin and the output voltage Vout, and converts the analog signals to digital signals Vind and Voutd. So the digitalized input voltage Vind has an associated value with the input voltage Vin, and the digitalized output voltage Voutd has an associated value with the output voltage Vout.

The comparing circuit 3064 receives the valley current signal Ivalley and the inductance current signal IL, wherein when the inductance current signal IL decreases to the valley current signal Ivalley, the comparing circuit 3064 flips, and the comparing signal Vcp turns to be valid, otherwise, the comparing signal Vcp is invalid.

In the example of FIG. 3, the PFC control circuit 306 further comprises a digital-to-analog converting circuit 3066, configured to convert the output signal of the calculating circuit 3062, i.e., the valley current signal Ivalley, to an analog signal. The comparing circuit 3064 comprises a comparator, configured to provide the comparing signal Vcp based on the valley current signal Ivalley and the inductance current signal IL.

In other embodiments, the inductance current signal IL is converted to a digital signal, and is compared with the valley current signal Ivalley in digital form by a digital comparator. In that case, the digital-to-analog converting circuit 3066 is omitted.

The intention of the comparing circuit 3064 is to obtain the comparing signal Vcp based on a comparing result of the valley current signal Ivalley and the inductance current signal IL, regardless of the signal forms.

In the example of FIG. 3, the pulse circuit 3063 receives the comparing signal Vcp, the on time delay signal Tdly and the on time signal Ton, and provides the power switch control signal G1 to control the on and off operation of the power switch PM. After a time period determined by the on time delay signal Tdly from the moment the comparing signal Vcp turns valid, the power switch PM is turned on. The power switch PM is turned off after an on time period determined by the on time signal Ton.

Figure 4:
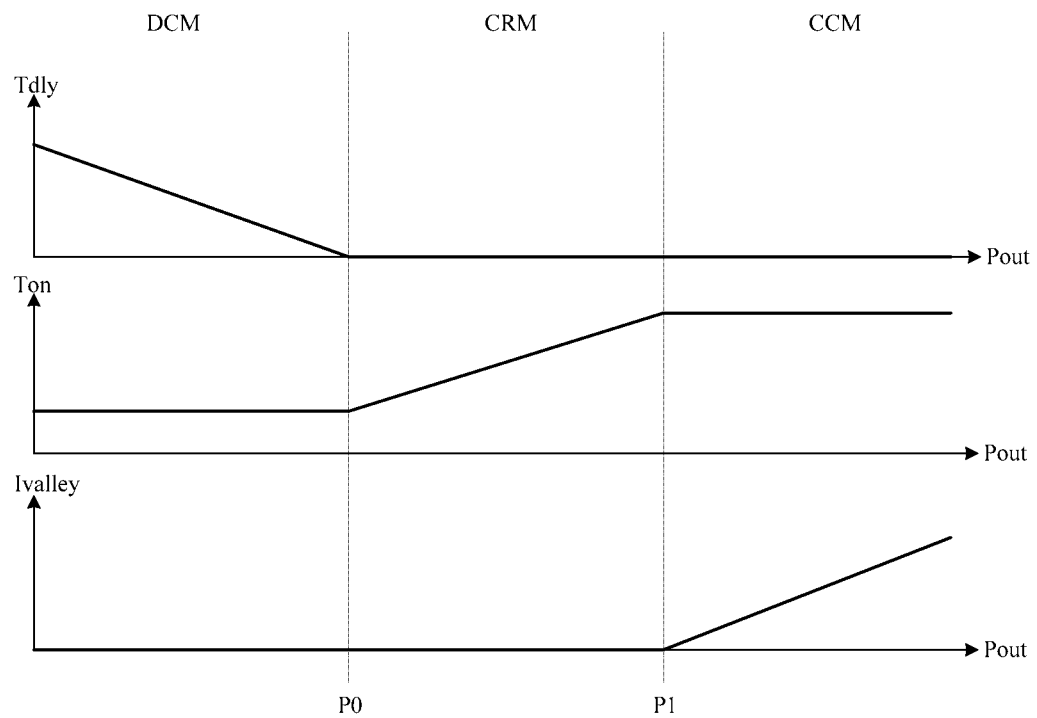
FIG. 4 schematically shows waveforms of signals Tdly, Ton and Ivalley of the PFC control circuit in accordance with an embodiment of the present invention.

FIG. 4 schematically shows waveforms of signals Tdly, Ton and Ivalley of the PFC control circuit in accordance with an embodiment of the present invention. As shown in FIG. 4, the on time delay signal Tdly, the on time signal Ton and the valley current signal Ivalley has different values under different work mode respectively.

When the system works under CRM, the on time signal Ton has a value represented by EQ (1) shown below:

$$Ton = \frac{2 \times L1 \times \eta \times Pin}{Vin\_rms^2} = \frac{2 \times L1 \times Pout}{Vin\_rms^2} = \frac{Vcomp}{Vin\_rms^2} \quad (1)$$

Wherein L1 represents the inductor of the power circuit 305, and also represents the inductance value of the inductor, Pin represents an input power of the PFC circuit, Pout represents the output power of the PFC circuit, Vin_rms represent an effective value of the input voltage Vin, and Vcomp represents a compensation signal generated based on a difference between the digitalized output voltage Voutd and an output voltage reference signal Voref. As can be seen from EQ (1), the compensation signal Vcomp is proportional to the output power Pout of the power circuit 305. Thus, when the on time signal Ton is generated based on the compensation signal Vcomp, it also means the on time signal Ton is generated based on the output power Pout.

The output power value P0 is the value of the output power Pout when the system works at a transition time from CRM to DCM, and the output power value P1 is the value of the output power Pout when the system works at a transition time from CRM to CCM. Accordingly, when the output power Pout has the value P0, the compensation signal Vcomp has a value Vcomp(P0), which is referred as a lower limit of the compensation signal Vcomp under CRM, and the on time signal Ton has a first on time period value $$Ton(P0) = \frac{Vcomp(P0)}{Vin_{rms}^2}.$$

When the output power Pout has the value P1, the compensation signal Vcomp has a value Vcomp(P1), which is referred as an upper limit of the compensation signal Vcomp under CRM, and the on time signal Ton has a second on time period value $$Ton(P1) = \frac{Vcomp(P1)}{Vin_{rms}^2}.$$

In other words, Vcomp(P0) is the value of the compensation signal Vcomp when the PFC circuit works at the transition time from CRM to DCM, and Vcomp(P1) is the value of the compensation signal Vcomp when the PFC circuit works at the transition time from CRM to CCM.

As shown in FIG. 4, the value of the on time signal Ton is fixed to be Ton(P0) in DCM, and is fixed to be Ton(P1) in CCM, in the present invention.

When the system works in DCM, the on time delay signal Tdly has a value represented by EQ (2) shown below:

$$Tdly = \frac{Vout}{Vout - Vin} \times \frac{Vcomp(P0)}{Vin\_rms^2} \times \left(\frac{Vcomp(P0)}{Vcomp} - 1\right) = \quad (2)$$

$$\frac{Vout}{Vout - Vin} \times Ton(P0) \times \left(\frac{Ton(P0) \times Vin_{rms}^2}{Vcomp} - 1\right)$$

In CRM and CCM, the value of the on time delay signal Tdly is negative according to EQ (2). However, the lower limit of the value of the on time delay signal Tdly is clamped to be 0. In other words, the value of the on time delay signal Tdly is 0 when working in CRM and CCM, as shown in FIG. 4.

When working in CCM, the current valley signal Ivalley has a value represented by EQ (3) shown below:

$$Ivalley = Vin \times \frac{Vcomp - Vcomp(P1)}{2L1 \times Vin\_rms^2} = \frac{Vin}{2L1}\left(\frac{Vcomp}{Vin_{rms}^2} - Ton(P1)\right) \quad (3)$$

In CRM and DCM, the value of the current valley signal Ivalley is negative according to EQ (3). However, the lower limit of the value of the current valley signal Ivalley is clamped to be 0. In other words, the value of the current valley signal Ivalley is 0 when working in CRM and DCM, as shown in FIG. 4.

For brevity, the values of the signals/devices are represented by the labels of the signals/devices in EQs (1)~(3).

Figure 5:
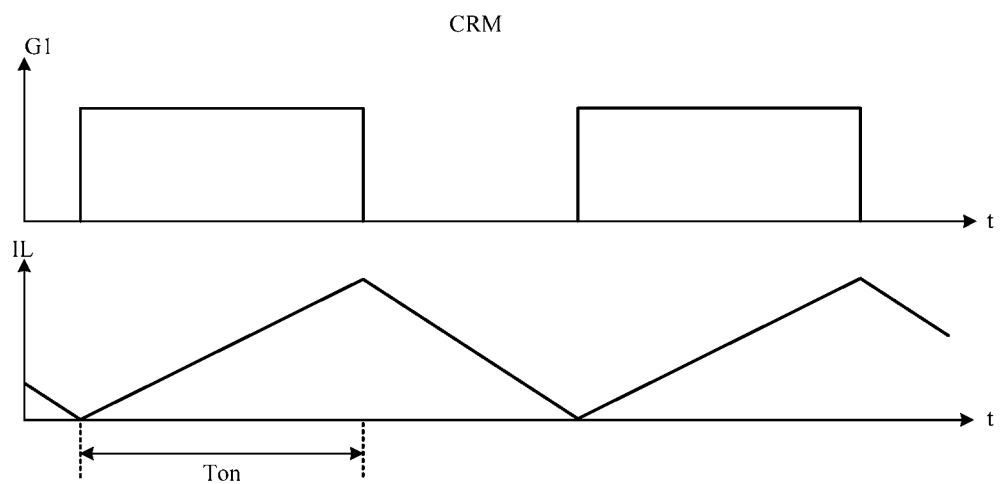
FIG. 5 shows a relationship between the power switch control signal G1 and the on time signal Ton in accordance with an embodiment of the present invention.

FIG. 5 shows a relationship between the power switch control signal G1 and the on time signal Ton in accordance with an embodiment of the present invention. As can be seen from FIG. 4, the current valley signal Ivalley and the on time delay signal Tdly are zero when working in CRM, and the on time signal Ton increases as the output power Pout increases, i.e., $$Ton = \frac{Vcomp(Pout)}{Vin\_rms^2},$$

wherein the compensation signal Vcomp increases as the output power Pout increases. Thus, when the inductance current signal IL decreases to the current valley signal Ivalley, i.e., the inductance current signal IL decreases to zero, the power switch control signal G1 turns on the power switch PM. Then after a time period determined by the on time signal Ton, the power switch control signal G1 turns off the power switch PM, and the inductance current signal IL decreases. When the inductance current signal IL decreases to zero, the power switch PM is turned on again, and a new switching period begins.

Figure 6:
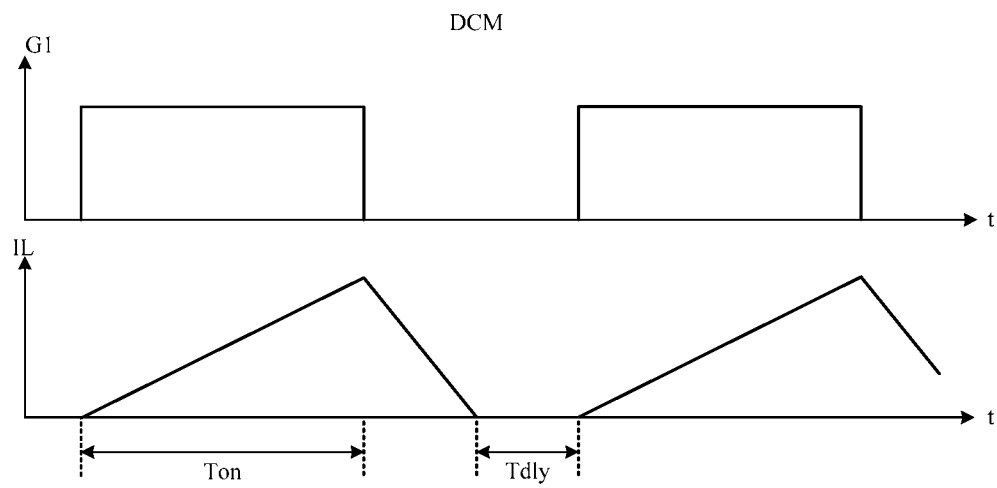
FIG. 6 shows a relationship between the power switch control signal G1 and the on time signal Ton, the on time delay signal Tdly in DCM according to an embodiment of the present invention.

FIG. 6 shows a relationship between the power switch control signal G1 and the on time signal Ton, the on time delay signal Tdly in DCM according to an embodiment of the present invention. As can be seen from FIG. 4, the current valley signal Ivalley is zero under DCM, and the on time signal Ton is fixed to be the first on time period value Ton(P0), while the on time delay signal Tdly increases as the output power Pout decreases as indicated by EQ (2). Thus, after a time period determined by the on time delay signal Tdly from the moment the inductance current signal IL decreases to the current valley signal Ivalley, the power switch PM is turned on by the power switch control signal G1. Then after a time period determined by the on time signal Ton(P0), the power switch PM is turned off by the power switch control signal G1. As a result, the inductance current signal IL decreases. When the inductance current signal IL decreases to zero, the power switch PM is turned on again, and a new switching period begins.

Figure 7:
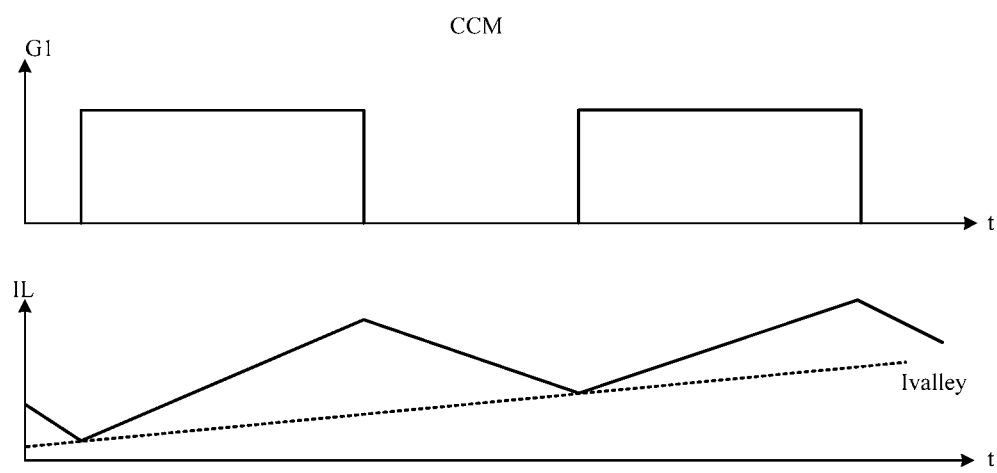
FIG. 7 shows a relationship between the power switch control signal G1 and the on time signal Ton, the on time delay signal Tdly in CCM (Continuous Current Mode) according to an embodiment of the present invention.

FIG. 7 shows a relationship between the power switch control signal G1 and the on time signal Ton, the on time delay signal Tdly in CCM according to an embodiment of the present invention. As can be seen from FIG. 4, the on time delay signal is zero in CCM, and the on time signal Ton is fixed to be the second on time period value Ton(P1), while the current valley signal Ivalley increases as the output power Pout increases as indicated by EQ (3). Thus, at the moment the inductance current signal IL decreases to the current valley signal Ivalley, the power switch PM is turned on by the power switch control signal G1. Then after a time period determined by the on time signal Ton(P1), the power switch PM is turned off by the power switch control signal G1. As a result, the inductance current signal IL decreases. When the inductance current signal IL decreases to the current valley signal Ivalley again, the power switch PM is turned on again, and a new switching period begins.

Figure 8:
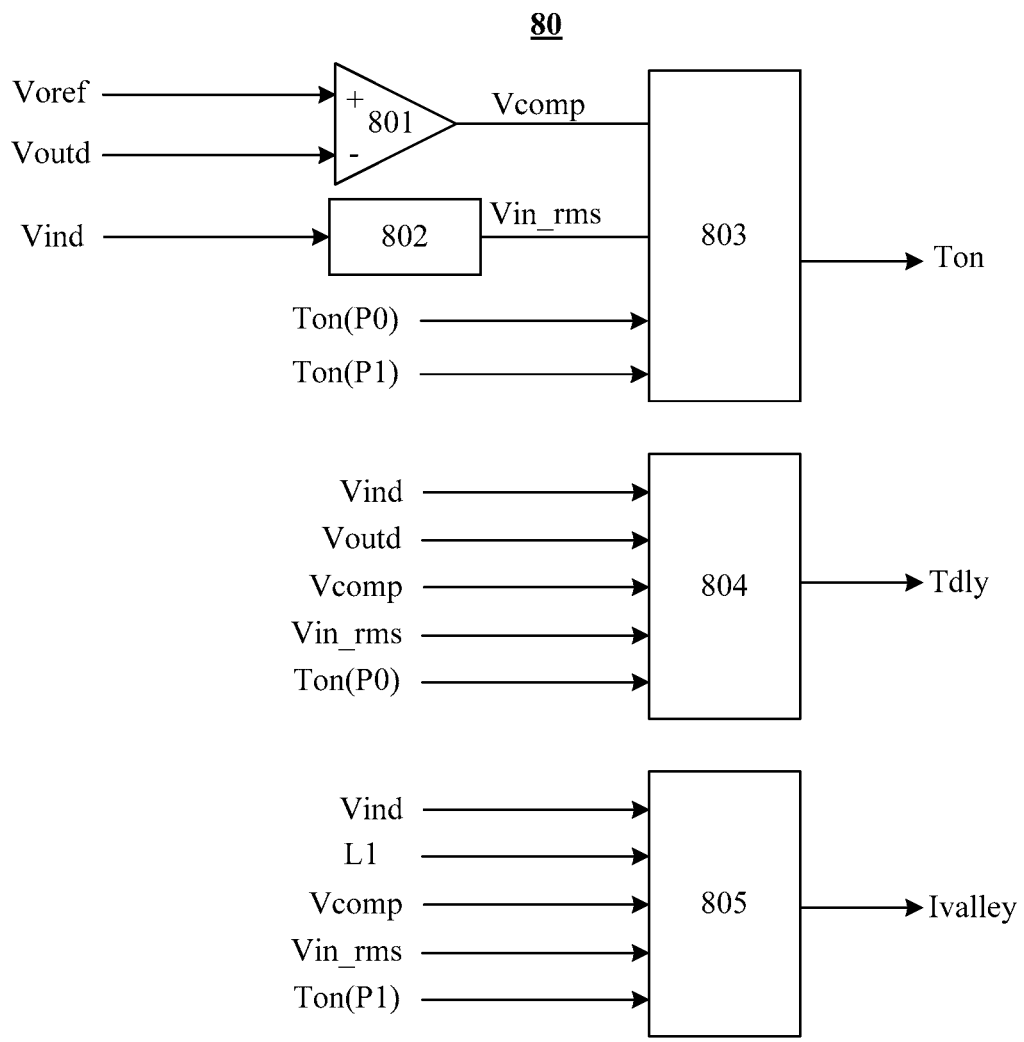
FIG. 8 schematically shows a calculating circuit 80 in accordance with an embodiment of the present invention.

FIG. 8 schematically shows a calculating circuit 80 in accordance with an embodiment of the present invention. As shown in FIG. 8, the calculating circuit 80 comprises: an error compensation circuit 801, configured to provide the compensation signal Vcomp based on the difference between the digitalized output voltage Voutd and the output voltage reference signal Voref; an effective value calculating circuit 802, configured to provide the effective value Vin_rms of the input voltage Vin based on the digitalized input voltage Vind; an on time control circuit 803, configured to provide the on time signal Ton based on the compensation signal Vcomp, the effective value Vin_rms of the input voltage Vin, the first on time period value Ton(P0) and the second on time period value Ton(P1) wherein the on time signal Ton is obtained according to EQ (1)

$$Ton = \frac{Vcomp}{Vin\_rms^2},$$

and wherein the lower limit of the value of the on time signal Ton is clamped to be the first on time period value Ton(P0), and an upper limit of the value of the on time signal Ton is clamped to be the second on time period value Ton(P1); an on time delay control circuit 804, configured to receive the digitalized input voltage Vind, the digitalized output voltage Voutd, the first on time period value Ton(P0), the effective value Vin_rms of the input voltage Vin, and the compensation signal Vcomp, and to generate the on time delay signal according to EQ (2), wherein the lower limit of the on time delay signal Tdly is clamped to be zero; and a current valley control circuit 805, configured to receive the digitalized input voltage Vind, the effective value Vin_rms of the input voltage Vin, the compensation signal Vcomp, the second on time period value Ton(P1) and an inductance value of the inductor of the PFC circuit, and to generate the current valley signal Ivalley according to EQ (3), wherein the lower limit of the current valley signal Ivalley is clamped to be zero.

The calculating circuit 80 shown in FIG. 8 is for illustrating the relationship between the different signals, and is not necessary the real circuit diagram. The calculating circuit 80 could be implemented by digital circuits based on EQs (1)~(3). The details of the calculating circuit 80 are different when using different methods to realize the circuit. For example, the circuit generated by VDHL (Very High Speed Integrated Circuits Hardware Description Language) maybe different from the circuit generated by Verilog language. Moreover, the circuits generated by a same language but describing in different ways would be different too. Thus, the present invention is not limited in any detail circuit. As long as the desired signals are generated in the similar way described in this disclosure, it is not departed from the spirit and the scope of the present invention.

In FIG. 8, the parameters needed for calculating the values for the on time signal Ton, the on time delay signal Tdly and the current valley signal Ivalley, e.g., the first on time period value Ton(P0), the second on time period value Ton(P1), the inductance value of the inductor L1 in the application could be set before running the system. Persons of ordinary skill in the art could choose the proper parameters according to the application, and the parameters could be stored in registers.

Figure 9:
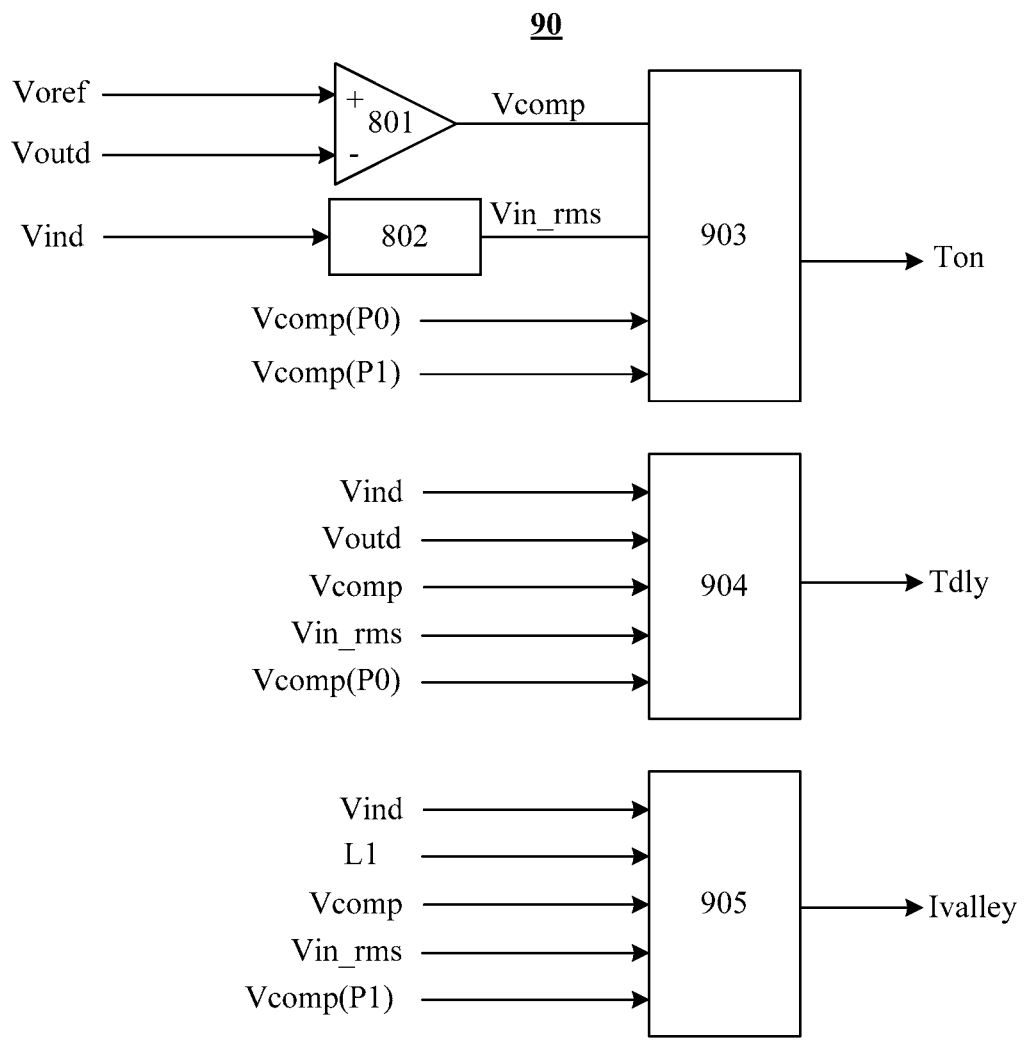
FIG. 9 schematically show a calculating circuit 90 in accordance with an embodiment of the present invention.

FIG. 9 schematically show a calculating circuit 90 in accordance with an embodiment of the present invention. As shown in FIG. 9, the calculating circuit 90 comprises: the error compensation circuit 801, configured to provide the compensation signal Vcomp based on the difference between the digitalized output voltage Voutd and the output voltage reference signal Voref; the effective value calculating circuit 802, configured to provide the effective value Vin_rms of the input voltage Vin based on the digitalized input voltage Vind; an on time control circuit 903, configured to provide the on time signal Ton based on the compensation signal Vcomp, the effective value Vin_rms of the input voltage Vin, the lower limit Vcomp(P0) of the compensation signal Vcomp and the upper limit Vcomp(P1) of the compensation signal Vcomp, wherein the on time signal Ton is obtained according to EQ (1)

$$Ton = \frac{Vcomp}{Vin\_rms^2},$$

and wherein the lower limit of the on time signal Ton is fixed to the first on time period value Ton(P0), and the upper limit of the on time signal Ton is fixed to the second on time period value Ton(P1); an on time delay control circuit 904, configured to receive the digitalized input voltage Vind, the digitalized output voltage Voutd, the lower limit Vcomp(P0) of the compensation signal Vcomp, the effective value Vin_rms of the input voltage Vin, and the compensation signal Vcomp, and to generate the on time delay signal Tdly according to EQ (2), wherein the lower limit of the on time delay signal Tdly is clamped to be zero; and a current valley control circuit 905, configured to receive the digitalized input voltage Vind, the effective value Vin_rms of the input voltage Vin, the compensation signal Vcomp, the upper limit Vcomp(P1) of the compensation signal Vcomp, and an inductance value of the inductor of the PFC circuit, and to generate the current valley signal Ivalley according to EQ(3), wherein the lower limit of the current valley signal Ivalley is clamped to be zero.

Compared with the calculating circuit 80 in FIG. 8, the calculating circuit 90 in FIG. 9 replaces the first on time period value Ton(P0) and the second on time period value Ton(P1) with the lower limit Vcomp(P0) and the upper limit Vcomp(P1) of the compensation signal Vcomp respectively.

When the output power Pout=P0, the compensation signal Vcomp has the value of the lower limit Vcomp(P0), and the on time signal Ton has the value of the first time period value Ton(P0). Thus, both of the lower limit Vcomp(P0) of the compensation signal Vcomp and the first time period value Ton(P0) correspond to the output power Pout at the transition time from CRM to DCM. When the output power Pout=P1, the compensation signal Vcomp has the value of the upper limit Vcomp(P1), and the on time signal Ton has the value of the second time period value Ton(P1). Thus, both of the upper limit Vcomp(P1) of the compensation signal Vcomp and the second time period value Ton(P1) correspond to the output power Pout at the transition time from CRM to CCM. So, the desired signals could be got either by setting the lower limit Vcomp(P0) and the upper limit Vcomp(P1) of the compensation signal Vcomp or by setting the first time period value Ton(P0) and the second time period value Ton(P1). Similarly, any other parameters which could reflect the output power Pout could be adopted by the present invention.

Figure 10:
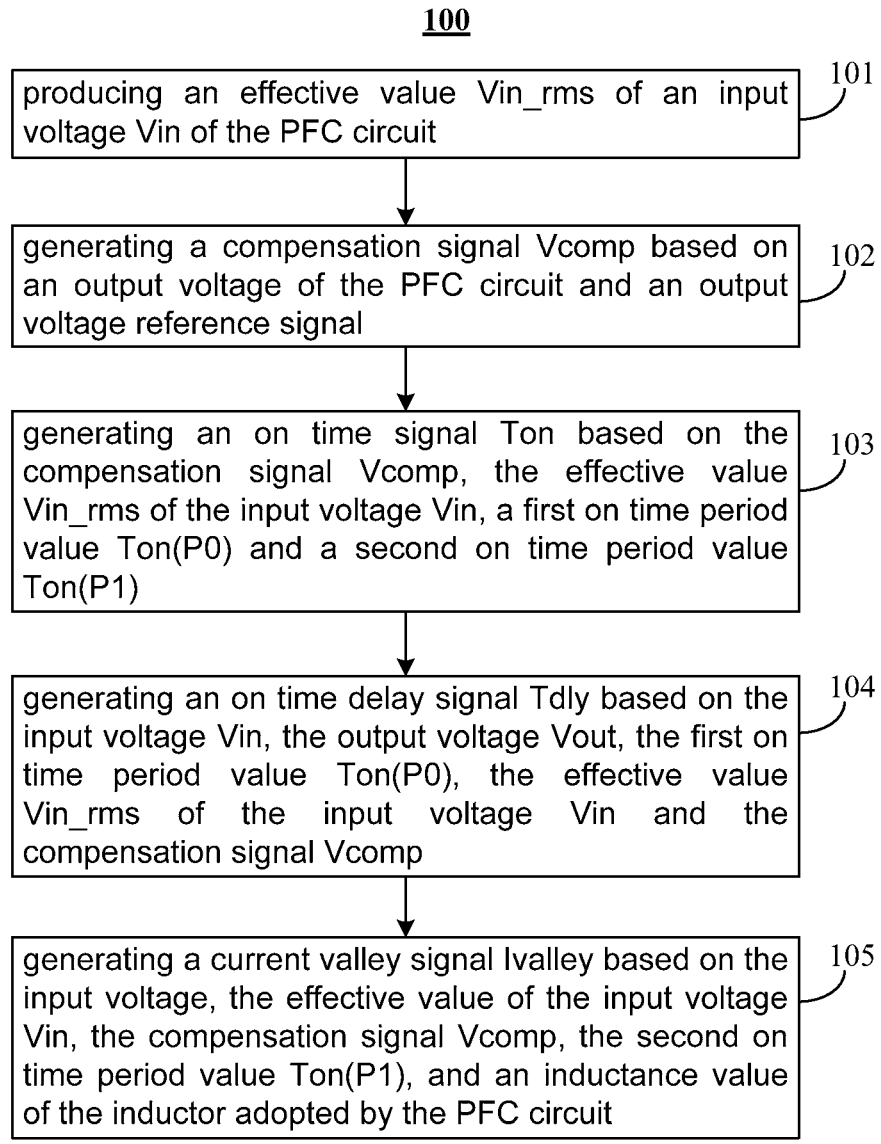
FIG. 10 shows a control method 100 of a PFC circuit.

FIG. 10 shows a control method 100 of a PFC circuit, wherein the PFC circuit comprises a power circuit having at least a power switch, the control method 100 comprises: step 101, producing an effective value Vin_rms of an input voltage Vin of the PFC circuit; step 102, generating a compensation signal Vcomp based on an output voltage of the PFC circuit and an output voltage reference signal; step 103, generating an on time signal Ton based on the compensation signal Vcomp, the effective value Vin_rms of the input voltage Vin, a first on time period value Ton(P0) and a second on time period value Ton(P1); step 104, generating an on time delay signal Tdly based on the input voltage Vin, the output voltage Vout, the first on time period value Ton(P0), the effective value Vin_rms of the input voltage Vin and the compensation signal Vcomp; step 105, generating a current valley signal Ivalley based on the input voltage, the effective value of the input voltage Vin, the compensation signal Vcomp, the second on time period value Ton(P1), and an inductance value of the inductor adopted by the PFC circuit; wherein, the first on time period value Ton(P0) is a value of the on time signal Ton when a value of the output power Pout is P0, and the second on time period value Ton(P1) is a value of the on time signal Ton when the value of the output power Pout is P1.

In one embodiment, the step 103 comprises: producing the on time signal Ton according to EQ (1)

$$Ton = \frac{Vcomp}{Vin\_rms^2},$$

wherein the lower limit of the on time signal Ton is clamped to be the first on time period value Ton(P0), and the upper limit of the on time signal Ton is clamped to be the second on time period value Ton(P1).

In one embodiment, the step 104 comprises: producing the on time delay signal Tdly according to EQ (2)

$$Tdly = \frac{Vout}{Vout - Vin} \times \frac{Vcomp(P0)}{Vin\_rms^2} \times \left(\frac{Vcomp(P0)}{Vcomp} - 1\right) =$$

$$\frac{Vout}{Vout - Vin} \times Ton(P0) \times \left(\frac{Ton(P0) \times Vin_{rms}^2}{Vcomp} - 1\right),$$

wherein the lower limit of the on time delay signal is clamped to be zero.

In one embodiment, the step 105 comprises: producing the current valley signal Ivalley according to EQ (3)

$$Ivalley = Vin \times \frac{Vcomp - Vcomp(P1)}{2L1 \times Vin\_rms^2} = \frac{Vin}{2L1} \times \left(\frac{Vcomp}{Vin_{rms}^2} - Ton(P1)\right),$$

wherein the lower limit of the current valley signal Ivalley is clamped to be zero.

In one embodiment, the control method 100 further comprises: step 106, determining the work mode of the PFC circuit, i.e., CCM, CRM, DCM, based on the value of the on time signal Ton; wherein, when the value of the on time signal Ton is smaller than the first on time period value Ton(P0), the PFC circuit works in DCM; when the value of the on time signal Ton is larger than the second on time period value Ton(P1), the PFC circuit works in CCM; and when the value of the on time signal Ton is between the first on time period value Ton(P0) and the second on time period value Ton(P1), the PFC circuit works under CRM.

Figure 11:
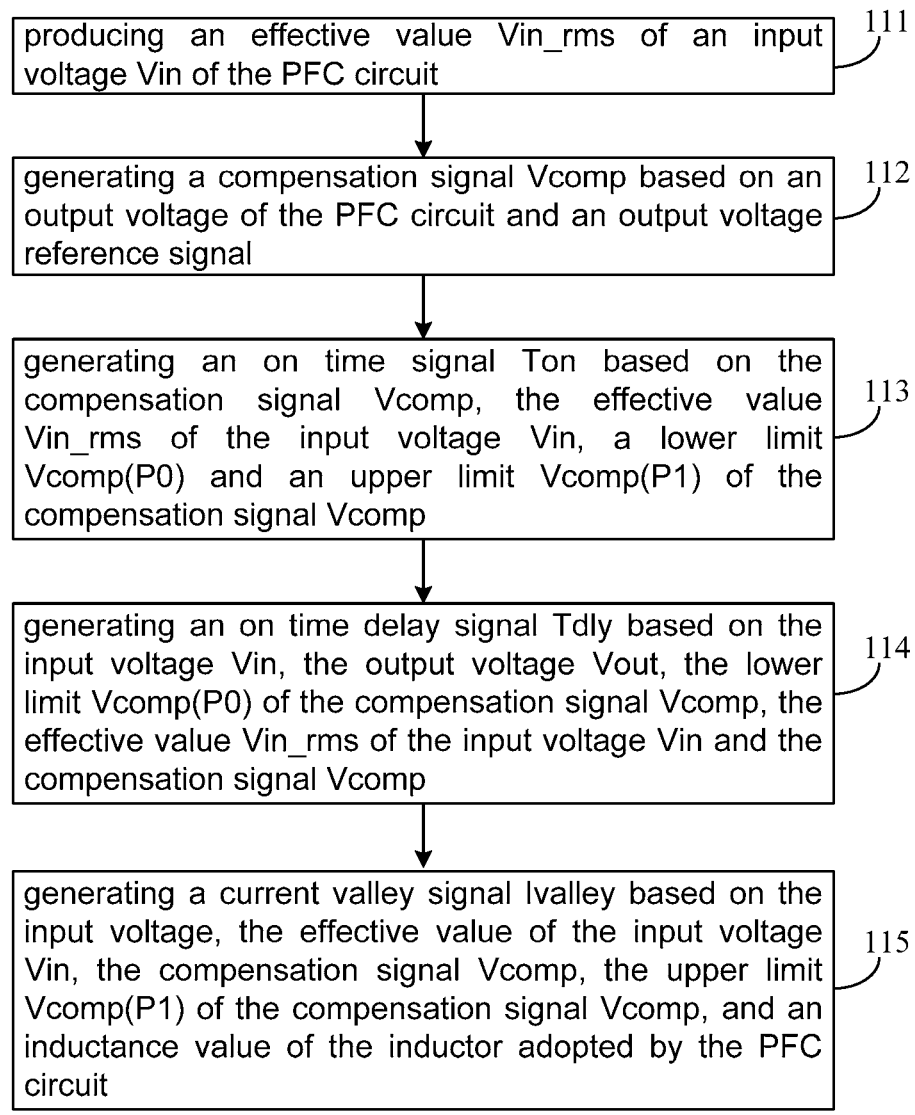
FIG. 11 shows a control method 110 of a PFC circuit.

FIG. 11 shows a control method 110 of a PFC circuit, wherein the PFC circuit comprises a power circuit having at least a power switch, the control method 110 comprises: step 111, producing an effective value Vin_rms of an input voltage Vin of the PFC circuit; step 112, generating a compensation signal Vcomp based on an output voltage of the PFC circuit and an output voltage reference signal; step 113, generating an on time signal Ton based on the compensation signal Vcomp, the effective value Vin_rms of the input voltage Vin, a lower limit Vcomp(P0) and an upper limit Vcomp(P1) of the compensation signal Vcomp; step 114, generating an on time delay signal Tdly based on the input voltage Vin, the output voltage Vout, the lower limit Vcomp(P0) of the compensation signal Vcomp, the effective value Vin_rms of the input voltage Vin and the compensation signal Vcomp; step 105, generating a current valley signal Ivalley based on the input voltage, the effective value of the input voltage Vin, the compensation signal Vcomp, the upper limit Vcomp(P1) of the compensation signal Vcomp, and an inductance value of the inductor adopted by the PFC circuit; wherein, the lower limit Vcomp(P0) of the compensation signal Vcomp is a value of the compensation signal Vcomp when the value of the output power Pout of the PFC circuit is P0, and the upper limit Vcomp(P1) of the compensation signal Vcomp is a value of the compensation signal Vcomp when the value of the output power Pout of the PFC circuit is P1.

In one embodiment, the step 113 comprises: producing the on time signal Ton according to EQ (1)

$$Ton = \frac{Vcomp}{Vin\_rms^2},$$

wherein the lower limit of the on time signal Ton is clamped to be a first on time period value Ton(P0) derived from the lower limit Vcomp(P0) of the compensation signal Vcomp according to EQ (1), and the upper limit of the on time signal Ton is clamped to be a second on time period value Ton(P1) derived from the upper limit Vcomp(P1) of the compensation signal Vcomp according to EQ (1).

In one embodiment, the step 114 comprises: producing the on time delay signal Tdly according to EQ (2)

$$Tdly = \frac{Vout}{Vout - Vin} \times \frac{Vcomp(P0)}{Vin\_rms^2} \times \left(\frac{Vcomp(P0)}{Vcomp} - 1\right) = \frac{Vout}{Vout - Vin} \times Ton(P0) \times \left(\frac{Ton(P0) \times Vin_{rms}^2}{Vcomp} - 1\right),$$

wherein the lower limit of the on time delay signal is clamped to be zero.

In one embodiment, the step 115 comprises: producing the current valley signal Ivalley according to EQ (3)

$$Ivalley = Vin \times \frac{Vcomp - Vcomp(P1)}{2L1 \times Vin\_rms^2} = \frac{Vin}{2L1}\left(\frac{Vcomp}{Vin_{rms}^2} - Ton(P1)\right),$$

wherein the lower limit of the current valley signal Ivalley is clamped to be zero.

In one embodiment, the control method 110 further comprises: step 116, determining the work mode of the PFC circuit, i.e., CCM, CRM, DCM, based on the value of the on time signal; wherein, when the value of the compensation signal Vcomp is smaller than the lower limit Vcomp(P0), the PFC circuit works in DCM; when the value of the compensation signal Vcomp(P1) is larger than the upper limit Vcomp(P1), the PFC circuit works in CCM; and when the value of the compensation signal Vcomp is between the lower limit Vcomp(P0) and the upper limit Vcomp(P1), the PFC circuit works in CRM.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control method of a PFC (Power Factor Correction) circuit, wherein the PFC circuit comprises a power circuit having at least one power switch, the control method comprising:

producing an effective value of an input voltage of the PFC circuit;

generating a compensation signal based on an output voltage of the PFC circuit and an output voltage reference signal;

generating an on time signal based on the compensation signal, the effective value of the input voltage, a first on time period value and a second on time period value;

generating an on time delay signal based on the input voltage, the output voltage, the first on time period value, the effective value of the input voltage and the compensation signal; and generating a current valley signal based on the input voltage, the effective value of the input voltage, the compensation signal, the second on time period value, and an inductance value of the inductor adopted by the PFC circuit; wherein the first on time period value is a value of the on time signal when the PFC circuit works at a transition time from critical current mode (CRM) to discontinuous current mode (DCM), and the second on time period value is a value of the on time signal when the PFC circuit works at a transition time from critical current mode (CRM) to continuous current mode (CCM).

2. The control method of claim 1, wherein generating an on time signal based on the compensation signal, the effective value of the input voltage, a first on time period value and a second on time period value comprises:

producing the on time signal Ton according to an equation $$Ton = \frac{Vcomp}{Vin\_rms^2},$$

wherein the lower limit of the on time signal is clamped to be the first on time period value, and the upper limit of the on time signal is clamped to be the second on time period value.

3. The control method of claim 1, wherein generating an on time delay signal based on the input voltage, the output voltage, the first on time period value, the effective value of the input voltage and the compensation signal comprises:
producing the on time delay signal Tdly according to an equation $$Tdly = \frac{Vout}{Vout - Vin} \times \frac{Vcomp(P0)}{Vin\_rms^2} \times \left(\frac{Vcomp(P0)}{Vcomp} - 1\right) =$$

$$\frac{Vout}{Vout - Vin} \times Ton(P0) \times \left(\frac{Ton(P0) \times Vin_{rms}^2}{Vcomp} - 1\right),$$

wherein the lower limit of the on time delay signal is clamped to be zero.

4. The control method of claim 1, wherein generating a current valley signal based on the input voltage, the effective value of the input voltage, the compensation signal, the second on time period value, and an inductance value of the inductor adopted by the PFC circuit comprises:
producing the current valley signal according to an equation $$Ivalley = Vin \times \frac{Vcomp - Vcomp(P1)}{2L1 \times Vin\_rms^2} = \frac{Vin}{2L1}\left(\frac{Vcomp}{Vin_{rms}^2} - Ton(P1)\right),$$

wherein the lower limit of the current valley signal Ivalley is clamped to be zero.

5. The control method of claim 1, further comprising:
determining the work mode of the PFC circuit based on the value of the on time signal, wherein
when the value of the on time signal is smaller than the first on time period value, the PFC circuit works in DCM;
when the value of the on time signal is larger than the second on time period value, the PFC circuit works in CCM; and
when the value of the on time signal Ton is between the first on time period value and the second on time period value, the PFC circuit works in CRM.

6. A control method of a PFC (Power Factor Correction) circuit, wherein the PFC circuit comprises a power circuit having at least one power switch, the control method comprising:
producing an effective value of an input voltage of the PFC circuit;
generating a compensation signal based on an output voltage of the PFC circuit and an output voltage reference signal;
generating an on time signal based on the compensation signal, the effective value of the input voltage, a lower limit and an upper limit of the compensation signal;
generating an on time delay signal based on the input voltage, the output voltage, the lower limit of the compensation signal, the effective value of the input voltage and the compensation signal;
generating a current valley signal based on the input voltage, the effective value of the input voltage, the compensation signal, the upper limit of the compensation signal, and an inductance value of the inductor adopted by the PFC circuit; wherein
the lower limit of the compensation signal represents a value of the compensation signal when the PFC circuit works at a transition time from critical current mode (CRM) to discontinuous current mode (DCM), and the upper limit of the compensation signal represents a value of the compensation signal when the PFC circuit works at a transition time from critical current mode (CRM) to continuous current mode (CCM).

7. The control method of claim 6, wherein generating an on time signal based on the compensation signal, the effective value of the input voltage, a lower limit and an upper limit of the compensation signal comprises:
producing the on time signal according to an equation $$Ton = \frac{Vcomp}{Vin\_rms^2},$$

wherein the lower limit of the on time signal is clamped to be a first on time period value solved by substituting the lower limit of the compensation signal to the equation $$Ton = \frac{Vcomp}{Vin\_rms^2},$$

and the upper limit of the on time signal is clamped to be a second on time period value solved by substituting the upper limit of the compensation signal to the equation $$Ton = \frac{Vcomp}{Vin\_rms^2}.$$

8. The control method of claim 6, wherein generating an on time delay signal based on the input voltage, the output voltage, the lower limit of the compensation signal, the effective value of the input voltage and the compensation signal comprises:
producing the on time delay signal according to an equation $$Tdly = \frac{Vout}{Vout - Vin} \times \frac{Vcomp(P0)}{Vin\_rms^2} \times \left(\frac{Vcomp(P0)}{Vcomp} - 1\right) =$$

$$\frac{Vout}{Vout - Vin} \times Ton(P0) \times \left(\frac{Ton(P0) \times Vin_{rms}^2}{Vcomp} - 1\right),$$

wherein the lower limit of the on time delay signal is clamped to be zero.

9. The control method of claim 6, wherein generating a current valley signal based on the input voltage, the effective value of the input voltage, the compensation signal, the upper limit of the compensation signal, and an inductance value of the inductor adopted by the PFC circuit comprises:
producing the current valley signal according to an equation $$Ivalley = Vin \times \frac{Vcomp - Vcomp(P1)}{2L1 \times Vin\_rms^2} = \frac{Vin}{2L1}\left(\frac{Vcomp}{Vin_{rms}^2} - Ton(P1)\right),$$

wherein the lower limit of the current valley signal is clamped to be zero.

10. The control method of claim 6, further comprising:
determining the work mode of the PFC circuit based on the value of the on time signal, wherein
when the value of the compensation signal is smaller than the lower limit, the PFC circuit works in DCM;

when the value of the compensation signal is larger than the upper limit, the PFC circuit works in CCM; and when the value of the compensation signal is between the lower limit and the upper limit, the PFC circuit works in CRM.

11. A PFC circuit having at least a power switch, comprising:
   an analog-to-digital converting circuit, configured to receive an input voltage and an output voltage of the PFC circuit, and to provide a digitalized input voltage and a digitalized output voltage;
   a calculating circuit, configured to receive the digitalized input voltage and the digitalized output voltage, and to provide an on time signal, an on time delay signal and a valley current signal;
   a comparing circuit, configured to provide a comparing signal based on the valley current signal and an inductance current signal indicating a current flowing through an inductor of the PFC circuit; and
   a pulse circuit, configured to control on operation of the power switch based on the comparing signal and the on time delay signal, and to control off operation of the power switch based on the on time signal; wherein
   a minimum value of the on time signal is fixed to a first on time period value, and a maximum value of the on time signal is fixed to a second on time period value.

12. The PFC circuit of claim 11, wherein the calculating circuit comprises:
   an on time control circuit, configured to provide the on time signal based on a compensation signal representing a difference between the digitalized output voltage and an output voltage reference signal, an effective value of the input voltage, the first on time period value and the second on time period value wherein the on time signal Ton is obtained according to an equation $$Ton = \frac{Vcomp}{Vin\_rms^2},$$

and wherein the lower limit of the value of the on time signal is clamped to be the first on time period value, and an upper limit of the value of the on time signal is clamped to be the second on time period value;
   an on time delay control circuit, configured to receive the digitalized input voltage, the digitalized output voltage, the first on time period value, the effective value of the input voltage, and the compensation signal, and to generate the on time delay signal according to an equation $$Tdly = \frac{Vout}{Vout - Vin} \times Ton(P0) \times \left( \frac{Ton(P0) \times Vin_{rms}^2}{Vcomp} - 1 \right),$$

wherein a lower limit of the on time delay signal is clamped to be zero; and
   a current valley control circuit, configured to receive the digitalized input voltage, the effective value of the input voltage, the compensation signal, the second on time period value and inductance value of an inductor of the PFC circuit, and to generate the current valley signal according to an equation $$Ivalley = \frac{Vin}{2L1} \times \left( \frac{Vcomp}{Vin_{rms}^2} - Ton(P1) \right),$$

wherein a lower limit of the current valley signal is clamped to be zero.

13. The PFC circuit of claim 12, wherein the calculating circuit further comprises:
   an error compensation circuit, configured to provide the compensation signal based on the difference between the digitalized output voltage and the output voltage reference signal; and
   an effective value calculating circuit, configured to provide the effective value of the input voltage based on the digitalized input voltage.

14. The PFC circuit of claim 11, wherein the calculating circuit comprises:
   an on time control circuit, configured to provide the on time signal based on a compensation signal representing a difference between the digitalized output voltage and an output voltage reference signal, an effective value of the input voltage, a lower limit of the compensation signal and an upper limit of the compensation signal, wherein the on time signal is obtained according to the equation $$Ton = \frac{Vcomp}{Vin\_rms^2},$$

and wherein a lower limit of the on time signal is fixed to the first on time period value, and an upper limit of the on time signal is fixed to the second on time period value;
   an on time delay control circuit, configured to receive the digitalized input voltage, the digitalized output voltage, the lower limit of the compensation signal, the effective value of the input voltage and the compensation signal, and to generate the on time delay signal according to an equation $$Tdly = \frac{Vout}{Vout - Vin} \times \frac{Vcomp(P0)}{Vin\_rms^2} \times \left( \frac{Vcomp(P0)}{Vcomp} - 1 \right),$$

wherein a lower limit of the on time delay signal is clamped to be zero; and
   a current valley control circuit, configured to receive the digitalized input voltage, the effective value of the input voltage, the compensation signal, the upper limit of the compensation signal, and an inductance value of an inductor of the PFC circuit, and to generate the current valley signal according to an equation $$Ivalley = Vin \times \frac{Vcomp - Vcomp(P1)}{2L1 \times Vin\_rms^2},$$

wherein a lower limit of the current valley signal is clamped to be zero.

15. The PFC circuit of claim 14, wherein the calculating circuit further comprises:
   the error compensation circuit, configured to provide the compensation signal based on the difference between the digitalized output voltage and the output voltage reference signal;

the effective value calculating circuit, configured to provide the effective value of the input voltage based on the digitalized input voltage.

16. The PFC circuit of claim 11, further comprising:
a digital-to-analog converting circuit, coupled to the calculating circuit to receive the valley current signal, and to convert the valley current signal to a signal in analog form.

17. The PFC circuit of claim 11, further comprising:
a power circuit, configured to receive the input voltage, and to convert the input voltage to an output voltage.

18. The PFC circuit of claim 11, further comprising:
a first input terminal and a second input terminal configured to receive an input AC voltage with a sine wave; and
a rectifying circuit, coupled to the first input terminal and the second input terminal to receive the input AC voltage, wherein the rectifying circuit converts the input AC voltage to an input voltage with a rectified sine wave.

* * * * *